UNITED STATES PATENT OFFICE.

ARTHUR F. QUIN, OF HUMBER BAY, AND CLIFFORD LACEY, OF TORONTO, ONTARIO, CANADA.

COMPOSITION OF MATTER FOR FIRE-BRICKS AND REFRACTORY LININGS.

1,355,689.  Specification of Letters Patent.  Patented Oct. 12, 1920.

No Drawing.  Application filed January 5, 1920. Serial No. 349,530.

*To all whom it may concern:*

Be it known that we, ARTHUR F. QUIN, of Humber Bay, and CLIFFORD LACEY, of the city of Toronto, both in the county of York, Province of Ontario, Canada, have invented certain new and useful Improvements in Compositions of Matter for Fire-Bricks and Refractory Linings, of which the following is a specification.

The object of this invention is to devise a composition of matter which may be molded into bricks or other forms for refractory linings for furnaces and the like in which high temperatures are developed, and which will not only successfully withstand high temperatures, but which can be cheaply made.

We attain our object by taking ground mica, asbestos and salt, all in a more or less finely ground or pulverulent condition, and mixing them thoroughly with a small quantity of water. The mixture is then molded into suitable form and subjected to pressure preferably of several tons to the square inch. The material may then be burned in a kiln at ordinary temperatures or may be used directly in the furnace.

The preferred proportions are six parts by weight of ground mica, six parts by weight of asbestos, and two parts by weight of common salt. With this any suitable coloring matter may be employed.

What we claim as our invention is:—

1. A refractory composition comprising mica, asbestos and salt ground and mixed.

2. A refractory composition comprising mica, asbestos and salt ground and mixed substantially in the proportions of six parts by weight of mica, six parts by weight of asbestos and two parts by weight of common salt.

Signed at Toronto this 19 day of Dec., 1919.

ARTHUR F. QUIN.
CLIFFORD LACEY.